US012662105B2

(12) United States Patent
Kang et al.

(10) Patent No.:  US 12,662,105 B2
(45) Date of Patent:       Jun. 23, 2026

(54) OFF-ROAD DRIVING ASSISTANCE DEVICE AND METHOD

(71) Applicants: HYUNDAI MOTOR COMPANY, Seoul (KR); KIA CORPORATION, Seoul (KR)

(72) Inventors: Jun Han Kang, Seoul (KR); Ik Jin Um, Busan (KR); Ji Hun Byun, Hwaseong-si (KR); Moon Joon Kim, Suwon-si (KR); Jung Ho Park, Incheon (KR); Young Ho Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 128 days.

(21) Appl. No.: 18/637,216

(22) Filed: Apr. 16, 2024

(65) Prior Publication Data

US 2025/0196838 A1      Jun. 19, 2025

(30) Foreign Application Priority Data

Dec. 18, 2023    (KR) ........................ 10-2023-0184045

(51) Int. Cl.
B60W 30/02          (2012.01)
B60W 10/04          (2006.01)
(Continued)

(52) U.S. Cl.
CPC ............ B60W 10/04 (2013.01); B60W 10/18 (2013.01); B60W 50/045 (2013.01);
(Continued)

(58) Field of Classification Search
CPC .... B60W 10/04; B60W 10/18; B60W 50/045; B60W 2520/04; B60W 2710/0672;
(Continued)

(56) References Cited

U.S. PATENT DOCUMENTS

| | | | |
|---|---|---|---|
| 11,767,787 B2 * | 9/2023 | Katayama | ............. F01N 3/2006 |
| | | | 60/602 |
| 2005/0104378 A1 * | 5/2005 | Matsuda | .................. B60K 6/52 |
| | | | 290/40 C |

(Continued)

FOREIGN PATENT DOCUMENTS

KR          20250016710 A       2/2025

OTHER PUBLICATIONS

KR 2019/0048206.translate (Year: 2019).*
(Continued)

*Primary Examiner* — B M M Hannan
(74) *Attorney, Agent, or Firm* — Lempia Summerfield Katz LLC

(57) ABSTRACT

An off-road driving assistance device may include: a receiver configured to receive driving information of a vehicle; a first controller configured to determine a stuck state probability score based on the driving information; and a second controller configured to control a magnitude of a driving torque or a braking torque based on the driving information and the stuck state probability score. The second controller may be configured to adjust a change in slope of the driving torque or the braking torque based on the stuck state probability score and control the magnitude of the driving torque or the braking torque.

19 Claims, 9 Drawing Sheets

(51) Int. Cl.
  B60W 10/18 (2012.01)
  B60W 30/18 (2012.01)
  B60W 50/04 (2006.01)

(52) U.S. Cl.
  CPC . *B60W 2520/04* (2013.01); *B60W 2710/0672* (2013.01); *B60W 2710/085* (2013.01); *B60W 2710/18* (2013.01)

(58) Field of Classification Search
  CPC ....... B60W 2710/085; B60W 2710/18; B60W 30/18172; B60W 2300/185; B60W 2520/10; B60W 2540/16; B60W 2540/18; B60W 2710/182; B60W 2720/30; B60W 30/18009; B60W 30/02; B60W 2710/0666; B60W 2710/083; B60Y 2300/18008
  USPC ........................................................... 701/1
  See application file for complete search history.

(56) References Cited

U.S. PATENT DOCUMENTS

| | | | | |
|---|---|---|---|---|
| 2009/0107748 A1* | 4/2009 | Luehrsen | ............... | B60K 28/16 701/84 |
| 2009/0112437 A1* | 4/2009 | Luehrsen | ............ | B60W 30/188 701/84 |
| 2011/0066341 A1* | 3/2011 | Ohtsu | ................... | B60W 10/06 701/65 |
| 2012/0130609 A1* | 5/2012 | Jess | ....................... | B60W 30/19 701/54 |
| 2017/0210392 A1* | 7/2017 | Shah | ..................... | B60W 50/14 |
| 2017/0238778 A1* | 8/2017 | Kim | ...................... | B62D 61/12 |
| 2017/0246954 A1* | 8/2017 | Kodama | ............. | B60W 50/087 |
| 2018/0370562 A1* | 12/2018 | Haller | ................. | B62D 5/0463 |
| 2020/0216056 A1* | 7/2020 | Sevel | .............. | B60W 30/18118 |
| 2021/0055728 A1* | 2/2021 | Pomish | ................ | G05D 1/0088 |
| 2022/0063589 A1* | 3/2022 | Son | ........................ | B60W 30/16 |
| 2022/0080952 A1* | 3/2022 | Um | ................ | B60W 30/18172 |
| 2022/0412182 A1* | 12/2022 | Samuel | ................... | E21B 47/04 |
| 2023/0125618 A1* | 4/2023 | Hawley | ................. | B60W 10/18 701/70 |
| 2023/0256786 A1* | 8/2023 | Johnson | ............... | B60G 21/106 280/5.515 |
| 2025/0033645 A1 | 1/2025 | Kang et al. | | |

OTHER PUBLICATIONS

KR 2011/0064834.translate (Year: 2011).*
KR20190048206.translate; Method for Controlling Driving Vehicle and Apparatus Thereof. Hyundai Mobis CO LTD. (Year: 2019).*

* cited by examiner

| DIVISION | STUCK STATE PROBABILITY | 50↓ | 60 | 70 | 80 | 90↑ |
|---|---|---|---|---|---|---|
| DRIVING TORQUE INCREASE SLOPE | MUD | 1.0 | 0.9 | 0.8 | 0.7 | 0.7 |
| | SAND | 1.0 | 0.7 | 0.6 | 0.5 | 0.5 |
| BRAKING TORQUE INCREASE SLOPE | MUD | 1.0 | 0.9 | 0.8 | 0.7 | 0.7 |
| | SAND | 1.0 | 0.9 | 0.8 | 0.7 | 0.7 |

FIG. 10

OFF-ROAD DRIVING ASSISTANCE DEVICE AND METHOD

CROSS-REFERENCE TO RELATED APPLICATION(S)

This application claims the benefit of priority to Korean Patent Application No. 10-2023-0184045 filed on Dec. 18, 2023, in the Korean Intellectual Property Office, the disclosure of which is incorporated herein by reference in its entirety.

BACKGROUND

1. Field

The present disclosure relates to an off-road driving assistance device and method.

2. Description of Related Art

The number of people who enjoy camping using vehicles and people who enjoy off-road driving sports is continuously increasing. Accordingly, there is a need for a technology that can allow a vehicle to drive comfortably and safely on unpaved off-road surfaces, distinct from general paved roads. Accordingly, various vehicle driving control modes that help control driving of a vehicle specialized for off-road surfaces have been developed.

In driving on off-road surfaces, a driver may need to be decisive in driving the vehicle so that the vehicle does not become stuck. Being stuck refers to a state in which a vehicle is fixed in a road surface and cannot move. When the vehicle is stuck, not only does the vehicle become unable to move, but there may also be significant difficulties in getting the vehicle to move again. Specifically, in the case of an inexperienced driver, as the driver controls the vehicle to get out of the stuck state, the vehicle may become more stuck. Accordingly, only by utilizing an external force such as a tow truck may the stuck vehicle eventually be released from the stuck state.

Therefore, when a vehicle drives on an off-road surface such as an unpaved road, it is important that the vehicle should not fall into a state in which the vehicle cannot move on the road surface and is stuck.

SUMMARY

In order to solve at least some of the problems, an aspect of the present disclosure provides an off-road surface driving assistance device capable of driving a vehicle so as to prevent the vehicle from being stuck. This is achieved by accurately determining the stuck state probability of a driving vehicle before the vehicle becomes stuck and by controlling driving torque of a vehicle driving on an off-road surface using the stuck state probability.

According to an aspect of the present disclosure, an off-road driving assistance device may include: a receiver configured to receive driving information of a vehicle; a first controller configured to determine a stuck state probability score based on the driving information; and a second controller. The second controller may be configured to control a magnitude of a driving torque or a braking torque based on the driving information and the stuck state probability score. The second controller may be also configured to adjust a change in slope of the driving torque or the braking torque based on the stuck state probability score and control the magnitude of the driving torque or the braking torque.

The second controller may be configured to decrease or increase the change in slope of the driving torque or the braking torque as the stuck state probability score increases or decreases.

The second controller may be configured to control the driving torque or the braking torque by one of a first off-road driving control and a second off-road driving control.

In the first off-road driving control, the second controller is configured to control the driving torque or the braking torque to occur immediately.

In the second off-road driving control, the second controller may be configured to adjust the change in slope of the driving torque or the braking torque based on the stuck state probability score and control a magnitude of the driving torque or the braking torque.

The off-road driving assistance device may further include a determination unit configured to determine performance of control by one of the first off-road driving control and the second off-road driving control.

The determination unit may be configured to determine the second controller to perform control by one of the first off-road driving control and the second off-road driving control, based on the magnitude of the driving torque or the braking torque and the stuck state probability score.

The off-road driving assistance device may further include a storage unit configured to store a table in which a change in slope of the driving torque and the braking torque based on the stuck state probability score is previously set.

The second controller may be configured to adjust the change in slope of the driving torque or the braking torque based on the table and control the magnitude of the driving torque or braking torque.

The off-road driving assistance device may further include a transmitter configured to transmit the magnitude of the driving torque or the braking torque to a driving device or a braking device.

According to another aspect of the present disclosure, an off-road driving assistance method may include: receiving driving information of a vehicle; determining a stuck state probability score; and controlling off-road driving based on the driving information and the stuck state probability score. In controlling off-road driving, a change in slope of a driving torque or a braking torque may be adjusted based on the stuck state probability score and a magnitude of the driving torque or the braking torque may be controlled.

In controlling off-road driving, as the stuck state probability score increases or decreases, the change in slope of the driving torque or the braking torque may decrease or increase.

In controlling off-road driving, the driving torque or the braking torque may be controlled by one of a first off-road driving control or a second off-road driving control.

In the first off-road driving control, in controlling off-road driving, the driving torque or the braking torque may be controlled to occur immediately.

In the second off-road driving control, in controlling off-road driving, the change in slope of the driving torque or the braking torque may be adjusted based on the stuck state probability score and the magnitude of the driving torque or the braking torque may be controlled.

Controlling off-road driving may further include a second condition determination operation configured to determine performance of control by one of the first off-road driving control or the second off-road driving control.

3

In controlling off-road driving, the second controller may be determined to perform control by one of the first off-road driving control or the second off-road driving control, based on the magnitude of the driving torque or the braking torque and the stuck state probability score.

In controlling off-road driving, the change in slope of the driving torque or the braking torque may be adjusted and the magnitude of the driving torque or the braking torque may be controlled, based on a table regarding a change in slope of the driving torque and the braking torque depending on the stuck state probability score, which is preset and stored in a storage unit.

Controlling off-road driving may further include transmitting the magnitude of the driving torque or the braking torque to a driving device or a braking device.

According to an embodiment of the present disclosure, by controlling driving torque of a vehicle based on the stuck state probability score and the driving information of the vehicle, it may be possible to help the vehicle to drive on an off-road surface more stably without becoming stuck.

BRIEF DESCRIPTION OF DRAWINGS

The above and other aspects, features, and advantages of the present disclosure should be more clearly understood from the following detailed description, taken in conjunction with the accompanying drawings, in which:

FIG. 10 illustrates a table of an upward slope of a driving torque and an upward slope of a braking torque according to an embodiment of the present disclosure.

DETAILED DESCRIPTION

Figure 1:
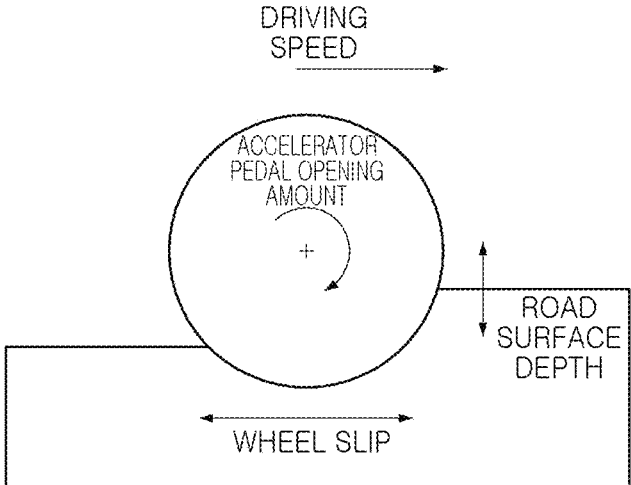
FIG. 1 is a schematic diagram of wheels of a vehicle driving on an off-road surface.

Hereinafter, the present disclosure may be variously changed and have various embodiments, specific embodiments thereof being described and illustrated in the drawings. However, the embodiments are not intended to limit the present disclosure. The idea of the present disclosure should be construed to extend to any alterations, equivalents, and substitutes besides the accompanying drawings.

It should be understood that, although the terms first, second, and the like, may be used herein to describe various elements, these elements should not be limited by these terms. These terms are generally only used to distinguish one element from another. For example, a first element could be termed a second element, and, similarly, a second element could be termed a first element, without departing from the scope of the present disclosure. The term "and/or" encompasses any combination of plural items or any one of the plural items.

The terms used herein are for the purpose of describing particular embodiments only and are not intended to be limiting of the present disclosure. A singular term also includes the plural of the term unless specifically stated otherwise in context. It should be further understood that the terms "comprises," "comprising," "includes," and/or "including," and variations thereof when used herein, specify the presence of stated features, integers, steps, operations, elements, and/or components. These terms do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. It should be further understood that terms, such as those defined in commonly used dictionaries, should be interpreted as having meanings that are consistent with their meanings in the context of the relevant art and should not be interpreted in an idealized or overly formal sense unless expressly so defined herein.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus.

Hereinafter, embodiments of the present disclosure are described with reference to the attached drawings.

FIG. 1 is a schematic diagram of wheels of a vehicle driving on an off-road surface.

Referring to FIG. 1, the vehicle speed, the opening amount or position of an accelerator pedal, wheel slip, and road surface severity acting on the wheels of a vehicle driving on an off-road surface are illustrated. The "opening amount" of an accelerator pedal as used herein may refer to a degree that the pedal is rotated, depressed, actuated, or the like.

The severity of a road surface may be a concept including information on a depth of the road surface, a condition of the road surface, and the like.

For example, the severity of the road surface may be estimated in consideration of a hard sand road surface, a scattered sand road surface, and a severely curved or uneven road surface.

Additionally, in the case of a muddy road surface, the severity of the road surface may be estimated in consideration of a depth at which the wheels are submerged in the mud, the stickiness of the mud, and the like.

Specifically, in the case of a mountain muddy road surface, the severity of the road surface may be estimated in consideration of a position and size of stones or rocks.

The road surface severity may be expressed using the concept of a road surface depth.

A road surface having a high stuck state probability due to harsh road conditions may be referred to as a deep road surface. On the other hand, a road surface on which the road surface conditions are not harsh and result in a low stuck state probability may be referred to as a shallow road surface.

In other words, the deep road surface and the shallow road surface may be a concept including information not only on the depth of the road surface but also on the condition of the road surface (e.g., a hard sand road surface, a loose sand road surface, a thin muddy road surface, a sticky muddy road surface, a small gravel road surface, a large rock road surface, and the like).

For example, when the vehicle is driving on a sand road surface, a small amount of sand may be accumulated. When a vehicle is driving on a relatively hard sand road surface, the amount of locking or slipping of the wheels of the vehicle is relatively small. As a result, there is a low probability of a stuck state occurring. In this case, a road surface having the low probability of the stuck state occurring may be referred to as a shallow road surface.

On the other hand, when the vehicle is driving on a sand road surface, there may be a high probability that the vehicle will get stuck on the sand road surface on which a large amount of sand is accumulated, and the wheels may be easily locked therein. A road surface having a high probability of the stuck state occurrence may be referred to as a deep road surface.

In other words, even when driving on the same sand road surface, there may be a road surface having the high probability of the vehicle becoming stuck, and there may be a road surface having the low probability of the vehicle becoming stuck.

A detailed description of a method for estimating road surface severity information is described below.

Figure 2:
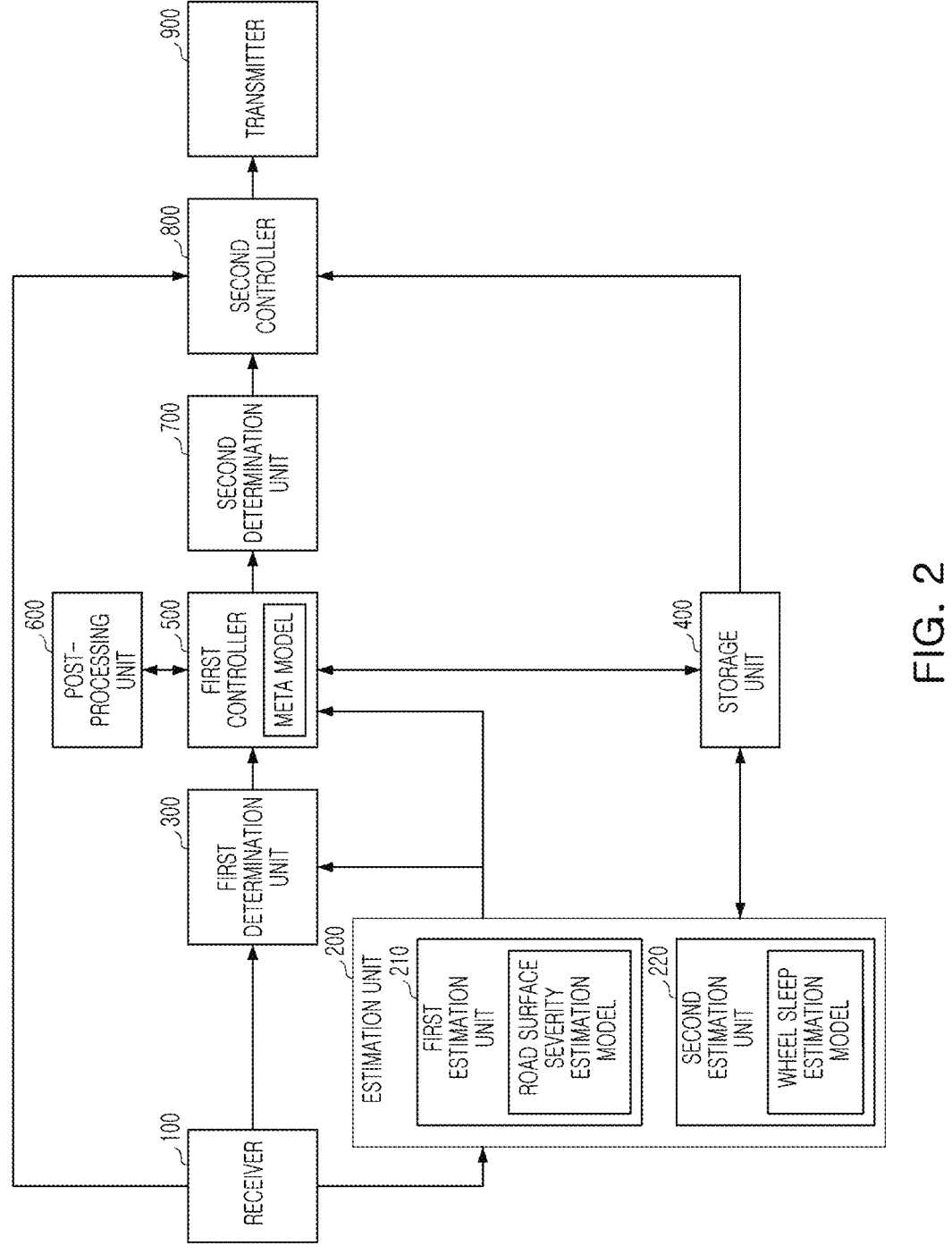
FIG. 2 is a block diagram of an off-road driving assistance device according to an embodiment of the present disclosure.

FIG. 2 is a block diagram of an off-road driving assistance device according to an embodiment of the present disclosure.

Referring to FIG. 2, the off-road driving assistance device according to an embodiment of the present disclosure may include a receiver 100, a first controller 500, and a second controller 800.

The receiver 100 may receive information about a driving state of the vehicle.

For example, the receiver 100 may receive information on the driving state including an accelerator pedal opening amount of the vehicle, a wheel slip ratio, a steering angle, a current driving gear ratio, vehicle speed, a road surface type, and a road surface severity.

The receiver 100 may be connected to sensors provided in the vehicle using a network provided in the vehicle and receive information on the driving state of the vehicle.

For example, the receiver 100 may receive accelerator pedal opening amount information from an accelerator pedal sensor (APS) using a controller area network (CAN) of the vehicle.

Additionally, the receiver 100 may receive a target driving torque, a current driving torque, and a target braking torque of the vehicle.

The target driving torque of the vehicle and the target braking torque of the vehicle may be values determined by a driving control device (e.g., auto terrain) of the vehicle based on driving information.

For example, the target driving torque of the vehicle may be determined by the driving control device of the vehicle (e.g., auto terrain) based on a road on which the vehicle is driving and based on the accelerator pedal opening amount.

Furthermore, after determining the target driving speed, the target driving torque may be used to determine an acceleration required for the vehicle to drive at the target driving speed. Additionally, the target driving torque may be used to determine the target starting torque based on the determined acceleration.

Additionally, the target braking torque may be used to determine the acceleration required for braking at a current driving speed of the vehicle. The target braking torque may also be determined based on the determined acceleration.

Additionally, in the case of a hydraulic braking device, target braking pressure may be determined to correspond to the target braking torque.

The off-road driving assistance device according to an embodiment of the present disclosure may further include a first determination unit 300.

The first determination unit 300 may determine whether to start determining a stuck state probability score of the first controller 500 based on the driving state of the vehicle.

In cases in which the probability of the vehicle becoming stuck is very low or the vehicle is in a driving state where it is difficult to accurately determine the probability of becoming stuck, the first determination unit 300 may prevent the first controller 500 from determining the stuck state probability score.

For example, the first determination unit 300 may not determine the probability of the vehicle becoming stuck in a situation in which a driving state is similar to a stopped vehicle (e.g., when the vehicle speed is 1.5 km/h (kilometer per hour) or less), a situation in which the vehicle is turning (e.g., when the steering angle is more than 360 degrees), and a situation in which the vehicle is reversing (e.g., when the vehicle is in a reverse gear).

The off-road driving assistance device according to an embodiment of the present disclosure may further include an estimation unit 200.

The estimation unit 200 may estimate additional driving information based on the driving state information received from the receiver 100. Additionally, the estimation unit 200 may include a first estimation unit 210 and a second estimation unit 220.

The road surface severity may be a concept including the probability of being stuck depending on the road surface condition on which the vehicle is driving. The road surface severity may be a numerical expression of the probability of the vehicle being stuck depending on the road surface condition on which the vehicle is driving.

The first estimation unit 210 may estimate the road surface severity using a road surface severity estimation model deeply learned using deep learning.

The deep learning may train a computer to distinguish objects by imitating an information processing method in which the human brain discovers patterns in a large amount of data and then distinguishes objects. By applying deep learning technology, the computer may be able to recognize, infer, and make decisions by itself without humans setting all determination standards.

A neural network is a type of deep learning and may be a technology that mimics the human brain. The neural network may extract 'feature values' of objects and may learn in a similar manner to humans. The neural network may calculate feature values rather than rules suggested by humans to identify objects.

The neural network may include an input layer, an output layer, and an intermediate layer. The intermediate layer may be referred to as a hidden layer. The presence of an intermediate layer may increase the number of layers of neurons responsible for processing. Having a multilayer neuron layer in the intermediate layer may be referred to as a deep neural network. Machine learning performed on the deep neural network may be referred to as deep learning.

The intermediate layer can be further multilayered to train and process more data.

When the intermediate layer is excessively multilayered, the number of parameters significantly increases. Additionally, as the number of neurons becomes more complex, unrelated combinations may increase, leading to overfitting, and performance may deteriorate due to such overfitting. A convolution neural network (CNN) may solve the overfitting problem.

The CNN is a type of multilayer perceptron (MLP) designed to use minimal preprocessing. The CNN may be comprised of one or several convolution layers and general artificial neural network layers on top thereof and may additionally utilize weights and pooling layers. The CNN may fully utilize input data having a two-dimensional structure.

A recurrent neural network (RNN), which shows high performance in time series data analysis, may include an input layer, an intermediate layer, and an output layer. Additionally, a value of a current intermediate layer may affect the calculation of a next output layer. The recurrent neural network may be a type of artificial neural network in which nodes in the intermediate layer are connected to directed edges to form a directed cycle.

Time series data may be data in which observed values are recorded at regular intervals over time. Unlike static data, the time series data may have many characteristics. For example, there may be time series data that changes relatively smoothly over time, and there may be time series data that changes rapidly (high frequency). Additionally, there may be time series data that repeats a specific pattern.

Due to the development of deep learning technology, it may be possible to analyze not only static data, but also to analyze and predict time series data and non-time series data. Obtaining reliable analysis and prediction results from time series data through deep learning may be limited by requiring a large amount of learning data. In reality, it may be difficult or time-consuming to obtain a large amount of data. An appropriate deep learning algorithm may be different depending on each time series data.

When the time series data is input into an inappropriate deep learning algorithm, it may be difficult to obtain desired results. There may be a problem in that the appropriate deep learning algorithm is different depending on the characteristics of the time series data, and learning data is often insufficient.

Even when there is little learning data, an integrated deep learning model that can output highly reliable results regardless of the characteristics of the time series data may be desired.

A learning model deeply learned using deep learning according to an embodiment of the present disclosure may undergo prior learning using various trained time series data (or learned time series data). In addition to time series data, non-time series data may also be trained.

The learning model may include a plurality of deep learning algorithms. An appropriate deep learning algorithm may be applied regardless of the type of time series data or non-time series data.

In the learning model according to an embodiment of the present disclosure, a state of the learning data may be determined, and a labeling task may be performed for preprocessing of the data.

For example, in a road surface severity estimation model described below, a labeling operation may be an operation to identify deep/shallow road surfaces required for learning.

An artificial intelligence learning model or a neural network model may be designed to implement a human brain structure on a computer and may include a plurality of network nodes with weights that simulate neurons of a human neural network. The plurality of network nodes may have a connection relationship with each other by simulating a synaptic activity of neurons in which neurons exchange signals through synapses. In an artificial intelligence learning model, the plurality of network nodes is disposed in layers of different depths and may exchange data according to convolutional connection relationships.

The artificial intelligence learning model may be, for example, an artificial neural network model, a convolution neural network (CNN) model, or the like.

For example, the artificial intelligence learning model may be learned through machine learning using methods such as supervised learning, unsupervised learning, and reinforcement learning.

In a machine learning algorithm for performing machine learning, Decision Tree, a Bayesian Network, Support Vector Machine, an Artificial Neural Network, Adaboost, Perceptron, Genetic Programming, clustering, or the like, may be used.

The first estimation unit 210 may estimate road surface severity having a score in a preset range using a road surface severity estimation model.

For example, the first estimation unit 210 may estimate road surface severity with a score ranging from 0 to 1 based on driving information.

The first estimation unit 210 may estimate a score closer to 0 for shallow road surfaces on which a stuck state of a vehicle is less likely to occur. Additionally, the first estimation unit 210 may estimate a score closer to 1 for deeper road surfaces on which the stuck state of a vehicle is more likely to occur.

The first estimation unit 210 may estimate road surface severity based on the estimated score.

For example, the first estimation unit 210 may estimate the road surface as a deep road when an estimated score is greater than a preset score. The first estimation unit 210 may estimate the road surface as a shallow road surface when the estimated score is smaller than the preset score.

The road surface severity estimation model may be formed of a deep learning network learned based on the type of road surface. The road surface severity estimation model may be formed of a plurality of deep learning networks. Each deep learning network may be learned based on the type of road surface.

For example, the road surface severity estimation model may include a first deep learning network and a second deep learning network.

The first deep learning network may be capable of deep learning based on data acquired from a sand road surface to determine whether the sand road surface is a deep road surface or a shallow road surface. Furthermore, the second deep learning network may be deeply trained based on data acquired from a muddy road surface and may determine whether the muddy road surface is a deep road surface or a shallow road surface.

Additionally, the first estimation unit 210 may estimate road surface severity by selecting a deep learning network included in the road surface severity estimation model according to the type of road surface input through the receiver 100.

Each deep learning network may include a convolution neural network (CNN) and a Long-shot Term Memory (LSTM) network having a 1D convolution layer.

For example, the road surface severity estimation model may be comprised of two deep learning networks. Among the two deep learning networks, one deep learning network may estimate sand road surface severity, and the other deep learning network may estimate muddy road surface severity.

The deep learning network that estimates the sand road surface severity and the deep learning network that estimates the muddy road surface severity may include a convolution neural network (CNN) having a 1D convolution layer and a Long-shot Term Memory (LSTM) network, respectively, each of which may be trained individually.

The first estimation unit 210 may also estimate the road surface severity without using a deeply learned road surface severity estimation model.

For example, the first estimation unit 210 may estimate the road surface severity by directly sensing the condition of the ground (e.g., the presence or absence of a water pool, a state of curvature of the road surface, or a depth at which the wheel is submerged in the road surface) using sensors such as a photo sensor, an infrared sensor, and a light detection and ranging (LiDAR)sensor.

The estimation unit 200 further includes a second estimation unit 220. The estimation unit 200 may estimate the off-road driving speed based on the driving information of the vehicle received from the receiver 100 using the second estimation unit 220.

The off-road driving speed may refer to vehicle speed estimated based on vehicle driving information received from the receiver 100. The vehicle speed includes the vehicle speed received from the receiver 100 and the off-road driving speed.

The second estimation unit 220 may estimate wheel slip of each wheel using a deeply learned wheel slip estimation model. The second estimation unit 220 may also estimate the off-road driving speed based on the estimated wheel slip ratio.

The wheel slip estimation model may estimate a wheel slip ratio and a variance value of each wheel by encoding input data using LSTM and decoding the input date through a linear layer.

The wheel slip estimation model may prevent information in the wheel from being lost using skip connection. More specifically, the wheel slip estimation model may prevent information in the wheel from being lost by combining an encoded signal and a signal in the wheel before encoding, using the LSTM.

Additionally, the LSTM used for encoding may be comprised of three layers. The linear layer used for decoding may be comprised of four layers and may further include an activation function between each linear layer.

The activation function may add non-linearity to output data. Additionally, the activation function according to an embodiment of the present disclosure may be leaky Rectified Linear Unit (ReLU). The LSTM, the skip connection, the linear layer, and the activation function themselves may be known technologies.

The wheel slip estimation model may be learned using the wheel slip ratio calculated using a global positioning system (GPS) as a true value.

The second estimation unit 220 may estimate the off-road driving speed based on the wheel slip ratio estimated using the wheel slip estimation model described above. The second estimation unit 220 may estimate the off-road driving speed by dividing the estimated wheel slip ratio into a case in which the estimated wheel slip ratio is less than a preset value (e.g., the wheel slip ratio is 0) and a case when the estimated wheel slip ratio is greater than the preset value.

For example, the second estimation unit 220 according to an embodiment of the present disclosure may estimate the driving speed using Equation 1 when the wheel slip ratio is less than a set value (e.g., 0). Additionally, the second estimation unit 220 may estimate the off-road driving speed of each wheel provided in the vehicle using Equation 2 when the wheel slip ratio is greater than or equal to the set value (e.g., 0).

$$V = \frac{R\omega}{\lambda + 1} \qquad \text{[Equation 1]}$$

$$V = (1 - \lambda)R\omega \qquad \text{[Equation 2]}$$

In Equations 1 and 2, V is off-road driving speed, R is an accompanying diameter of a tire, $\lambda$ is a wheel slip ratio, and $\omega$ is a rotational angular speed of a wheel.

The second estimation unit 220 may estimate the off-road driving speed using a wheel slip estimation model deeply learned using a GPS value. As a result, the second estimation unit 220 more accurately estimates the vehicle speed even on an off-road surface in which large wheel slip occurs.

Additionally, the probability of the vehicle being stuck may be determined using a more accurate off-road driving speed, thereby improving the reliability of determining the probability of the vehicle being stuck.

However, the off-road driving speed is not limited to being estimated using the second estimation unit 220. The vehicle speed received from the receiver 100 using a speed sensor provided in the vehicle or the vehicle speed estimated using the received driving information may be applied.

The off-road driving assistance device according to an embodiment of the present disclosure may further include a storage unit 400.

The storage unit 400 may store a road surface severity estimation model and a wheel slip estimation model formed of a trained deep learning network.

Additionally, the storage unit 400 may store driving information received through the receiver 100 and information estimated by the estimation unit 200.

Additionally, the storage unit 400 may store a table regarding a driving torque increase slope and a braking torque increase slope according to a stuck state probability score used in a second controller described below.

For example, the storage unit 400 may store information on the accelerator pedal opening amount received through the receiver 100. The storage unit 400 may store information about the road surface severity estimated by the first estimation unit 210.

Additionally, the storage unit 400 may store the table illustratively illustrated in FIG. 10.

The storage unit 400 is a recording medium suitable for storing the table regarding: a road surface severity estimation model; a wheel slip estimation model; driving information; and a driving torque increase slope and a braking torque increase slope depending on the stuck state probability score. The storage unit 400 may include: magnetic media such as a hard disk, a floppy disk, and a magnetic tape; optical media such as a compact disk read only memory (CD-ROM), and a digital video disk (DVD); magneto-optical media such as a floptical disk, a flash memory, or erasable programmable ROM (EPROM); or a semiconductor memory such as SSD manufactured based thereon.

When the first determination unit 300 decides to determine the probability of the vehicle being stuck, the first controller 500 may determine the probability of the vehicle being stuck based on the driving information received from the receiver 100 or the information estimated by the estimation unit 200. The first controller 500 may quantify and determine the probability of the vehicle being stuck.

The first controller 500 may determine the probability of the vehicle being stuck using information on the accelerator pedal opening amount, the vehicle speed, the wheel slip ratio, and the severity of the road surface on which the vehicle is driving.

The information on the accelerator pedal opening amount, the vehicle speed, the wheel slip ratio, and the severity of the road surface on which the vehicle is driving may be received from the receiver 100 or the estimation unit 200.

The first controller 500 may determine the probability of the vehicle being stuck using a meta model. The meta model may be preset and stored and may be updated periodically or continuously based on real-time driving data.

The meta model may be defined as a function including a plurality of parameters. Each of the plurality of parameters constituting the meta model may be formed of individual functions. The meta model may be formed of the plurality of parameters in a multiplication form or an addition form.

The meta model formed in the multiplication form may be referred to as a first meta model, and the meta model formed in the addition form may be referred to as a second meta model.

Additionally, each of the plurality of parameters may be formed in a function determined according to a single input value. The input value for determining the plurality of parameters may include one or more of the wheel slip ratio, the accelerator pedal opening amount, the vehicle speed, and the road surface severity.

In other words, the first controller 500 may determine the stuck state probability using the meta model. Additionally, the first meta model according to an embodiment of the present disclosure is calculated and determined as in Equation 3 below.

$$S_{total1} = \min\left(1, S_{slip1} * S_{APS1} * S_{vel1} * S_{D/S,1}\right) \quad \text{[Equation 3]}$$

According to Equation 3, $S_{total1}$ may be the stuck state probability estimated in the first meta model, $S_{slip1}$ may be a parameter determined based on a slip, $S_{APS1}$ may be a parameter determined based on the accelerator pedal opening amount, $S_{vel1}$ may be a parameter calculated based on the vehicle speed, and $S_{D/S,1}$ may be a parameter determined based on the road surface severity.

$S_{slip1}$, $S_{APS1}$, $S_{vel1}$, and $S_{D/S,1}$, which constitute the first meta model, may each be calculated and determined according to a function including a single variable. Furthermore, each of $S_{slip1}$, $S_{APS1}$, $S_{vel1}$, and $S_{D/S,1}$ may be determined through mathematical equations illustratively expressed as Equations 4-7 below.

$$S_{slip1} = -\exp(-4.5 * \lambda) + 1 \quad \text{[Equation 4]}$$

According to Equation 4, $\lambda$ may be a wheel slip ratio, and the wheel slip ratio may be obtained by receiving and utilizing a value measured through the receiver 100, or by utilizing a value estimated from a deeply learned wheel slip estimation model of the second estimation unit 220.

$$S_{APS1} = (0.282 * \exp(-0.158 * aps) + 0.218 * \exp(0.0152 * aps) \quad \text{[Equation 5]}$$

According to Equation 5, aps may be an accelerator pedal opening amount.

$$S_{vel1} = \max(1, V)^{-1/3} \quad \text{[Equation 6]}$$

According to Equation 6, V may be vehicle speed, and the vehicle speed may be obtained by receiving and utilizing a vehicle speed value measured through the receiver 100, by utilizing an off-road driving speed value estimated by the second estimation unit 220, or by utilizing a vehicle speed value measured using GPS.

$$S_{D/S1} = 0.7 + 0.5 * W \quad \text{[Equation 7]}$$

According to Equation 7, W may be a score value related to road surface severity received from the first estimation unit 210 of the estimation unit 200.

Additionally, the second meta model that is based on addition may calculate the stuck state probability based on Equation 8 expressed below. The second meta model may determine the stuck state probability using different formulas depending on the type of road surface.

In other words, the second meta model may determine the stuck state probability in different manners depending on the type of road surface by changing and applying a constant value applied to the parameter depending on the type of road surface.

$$S_{total2-1} = \max\left(0, \min\left(1, w_1 S_{slip2} * S_{APS2} + w_2 S_{D/S,2} - w_3 S_{vel2}\right)\right) \quad \text{[Equation 8]}$$

In the case of a muddy road surface, there may be, $w_1=0.7$, $w_2=0.6$, $w_3=0.3$ and in the case of the sand road surface, there may be $w_1=0.9$, $w_2=0.4$, $w_3=0.3$. Referencing Equation 8, $w_1$, $w_2$, $w_3$ are values determined by an experiment and may be values that can be adjusted depending on the type of vehicle used in the experiment, the type of applied tire, and the like.

Additionally, when the vehicle is controlled autonomously in a stuck mode and the like, rather than by a driver, the stuck state probability may be calculated in the second meta model according to a mathematical equation described in Equation 9.

When the vehicle is automatically controlled, the accelerator pedal opening amount value cannot exist unlike when the user controls the vehicle, so that the stuck state probability may be calculated without the data on the accelerator pedal opening amount.

The stuck mode may be an optimal autonomous driving mode set according to the type of road surface on which the vehicle is driving, the severity of the road surface, and the like.

$$S_{total2-2} = \max\left(0, \min\left(1, w_1 S_{slip2} + w_2 S_{D/S,2} - w_3 S_{vel2}\right)\right) \quad \text{[Equation 9]}$$

In the case of the muddy road surface, there may be $w_1=0.7$, $w_2=0.72$, $w_3=0.3$, and in the case of the sand road surface, there may be $w_1=1.3$, $w_2=0.5$, $w_3=0.2$. Referencing Equation 9, $w_1$, $w_2$, $w_3$ are values determined by an experiment and may be values that can be adjusted depending on the type of vehicle used in the experiment, the type of applied tire, and the like.

$S_{slip2}$, $S_{APS2}$, $S_{vel2}$, and $S_{D/S,2}$, which constitute the second meta model, may each be calculated and determined according to a function including a single variable. Additionally, each of $S_{slip2}$, $S_{APS2}$, $S_{vel2}$, and $S_{D/S,2}$ may be calculated as shown in Equations 10-13 below.

$$S_{slip2} = -\exp(-4.5 * \lambda) + 1 \quad \text{[Equation 10]}$$

According to Equation 10, $\lambda$ may be a wheel slip ratio. The wheel slip ratio may be obtained by receiving and utilizing a value measured through the receiver 100, or by utilizing a value estimated from the deeply learned wheel slip estimation model of the second estimation unit 220.

$$APS \geq 15, \quad \text{[Equation 11]}$$

$$S_{APS2-1} =$$

$$(0.2874 * \exp(-0.1591 * aps) + 0.4153 * \exp(0.0088 * aps))$$

$$APS < 15,$$

$$S_{APS2-2} = \frac{0.2}{15} * aps + 0.3$$

According to Equation 11, aps may be an accelerator pedal opening amount. $S_{APS2}$ may be determined by utilizing the accelerator pedal opening amount in different manners by dividing the accelerator pedal opening amount, based on a preset value (e.g., 15), into a case in which the accelerator pedal opening amount is more than the preset value and a case in which the accelerator pedal opening amount is less than the preset value.

$$S_{vel2} = \max\left(0, \min\left(1, \text{sign}(V-5) * \left(\frac{1}{15} * (V-5)\right)^2\right)\right) \quad \text{[Equation 12]}$$

According to Equation 12, V may be vehicle speed. The vehicle speed may be obtained by receiving and utilizing a vehicle speed value measured through the receiver 100, by utilizing an off-road driving speed value estimated by the second estimation unit 220, or by utilizing a vehicle speed value measured using the GPS.

$$S_{D/S,2} = W \quad \text{[Equation 13]}$$

According to Equation 13, W may be a score value related to road surface severity received from the first estimation unit 210 of the estimation unit 200.

The function for each parameter may refer to a function for the risk of occurrence of a stuck state corresponding to a variable included in each function. For example, $S_{slip}$ may be a function of the risk of stuck state occurrence due to changes in the wheel slip ratio.

The function for each parameter may be derived by analyzing data acquired through actual driving.

In order to derive a value for the risk of a stuck state occurrence, a high stuck state ratio shown in Equation 14 below may be calculated.

$$\text{high stuck ratio} = \frac{\text{num Deep Label}}{\text{num Deep Label} + \text{num Shallow Label}} \quad \text{[Equation 14]}$$

According to Equation 14, the high stuck state ratio may be calculated based on road surface severity information received from the estimation unit 200 (more specifically, the first estimation unit 210), and the first estimation unit 210 may be calculated based on area information estimated from a deep road surface and a shallow road surface. The deep road surface may be a road surface having a high probability of a stuck state occurrence, and the shallow road surface may be a road surface having a low probability of a stuck state occurrence.

Additionally, an expert may label deep and shallow road sections by actually driving and determining the stuck state probability of the road surface and may receive information on the deep and shallow road sections using a learned road surface estimation model.

The high stuck state ratio can be determined as a ratio of the number estimated to be a deep road surface to the sum of the number estimated to be a deep road surface and the number estimated to be a shallow road surface, in the corresponding section or the corresponding parameter.

In order to derive a function for each parameter, the expert may drive the vehicle and simultaneously obtain information on the wheel slip ratio, the accelerator pedal opening amount, the vehicle speed, and information on the severity of the road surface on which the vehicle is driving.

Information on the estimated high stuck state ratio may be obtained based on the wheel slip ratio, the accelerator pedal opening amount, the vehicle speed of the vehicle, and the road surface severity. Additionally, a relationship between the wheel slip ratio, the accelerator pedal opening amount, the vehicle speed, and the high stuck state ratio of the vehicle may be approximated with a simple function.

The functional relationship between the wheel slip ratio, the accelerator pedal opening amount, the vehicle speed, and the high stuck state ratio of the vehicle may be estimated probabilistically using regression analysis. Additionally, the functional relationship may be estimated using a best-fit line, a trend line, and curve fitting using interpolation or approximation.

Additionally, the functional relationship between the wheel slip ratio, the accelerator pedal opening amount, the vehicle speed, and the high stuck state ratio of the vehicle may be estimated using various known methods such as approximation by linear combination of exponential functions, Laplace approximation, and least squares approximation.

A post-processing unit 600 may post-process results determined by the first controller 500. The post-processing unit 600 may apply various post-processing depending on the type of meta model used in the first controller 500.

The post-processing unit 600 may determine the stuck state probability using the number of windows in which a stuck state probability score exceeding a preset score is calculated during a preset time. A post-processing method of determining the stuck state probability using the number of windows may be referred to as a first post-processing method.

More specifically, the post-processing unit 600 may generate a window that stores score calculated by the first controller 500.

For example, the post-processing unit 600 may generate 20 windows at 50 ms (milli-second) intervals. Scores may be stored in the generated window.

1 or 0 may be stored in the generated window. When a score (e.g., 0.3) calculated by the first controller 500 is greater than a preset score (e.g., 0.15), 1 may be stored in a corresponding window. Furthermore, when the score (e.g., 0.1) calculated by the first controller 500 is less than a preset score (e.g., 0.15), 0 may be stored.

The stuck state probability may be expressed in numbers as a ratio of the number of windows exceeding a preset score to a preset window size. For example, when there are 15 windows in which 1 is stored, among 20 windows, the stuck state probability may be displayed as 75 percent.

Data input to the window may have a first in first out (FIFO) structure. The FIFO structure may be a structure in which data is sequentially output in the order in which data is input, i.e., a value input first is output first.

The first post-processing method may be applied to the stuck state probability score determined using the first meta model.

Specifically, when the first meta model determines the stuck state probability score, the result falls within a range of 0 and 1. While the stuck state probability score changes depending on the parameters, it is very rare for the score to approach a value close to 1.

In this case, using the first post-processing method, the value may be more easily determined between 0 and 1.

The post-processing unit 600 may use an exponential moving average (EMA).

The post-processing using the exponential moving average may be referred to as second post-processing.

The exponential moving average (EMA) may be a moving average that gives greater weight and significance to the most recent data point.

By utilizing the exponential moving average, the post-processing unit 600 may prevent noise in the stuck state probability score calculated by a stuck state probability calculation unit and may derive a more accurate stuck state probability by reflecting past values.

When applying the exponential moving average, the post-processing unit 600 may perform post-processing by applying at least two exponential parameters based on the stuck state probability score calculated by the first controller 500.

The exponential moving average increases a proportion of past data as a size of the exponential parameter increases, thereby allowing for more stable and accurate estimation. However, with an increase in the proportion of past data, immediate response to current data may not be possible and delay times may occur.

A second post-processing method may reduce noise in the stuck state probability score determined when applied to the second meta model and may determine the stuck state probability more accurately.

The off-road driving assistance device according to an embodiment of the present disclosure may further include a second determination unit 700.

The second determination unit 700 may determine the off-road driving control to be performed by the second controller 800, based on the driving information received from the receiver 100 and the stuck state probability score received from the first controller 500.

The second controller 800 may perform off-road driving control based on the results of the second determination unit 700. The second controller 800 may include first off-road driving control and second off-road driving control.

The first off-road driving control may be control for generating driving torque and braking torque according to driving information received from the receiver 100.

The second off-road driving control may control the vehicle to ascend at a predetermined slope when generating driving torque and braking torque received from the receiver 100.

Figure 3:
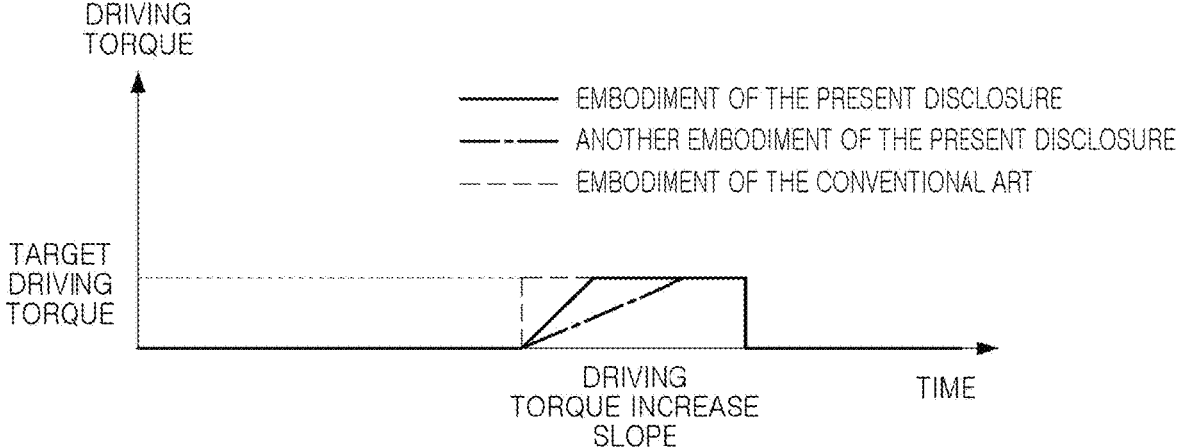
FIG. 3 is a graph illustrating a driving torque increase in slope according to an embodiment of the present disclosure.
Figure 4:
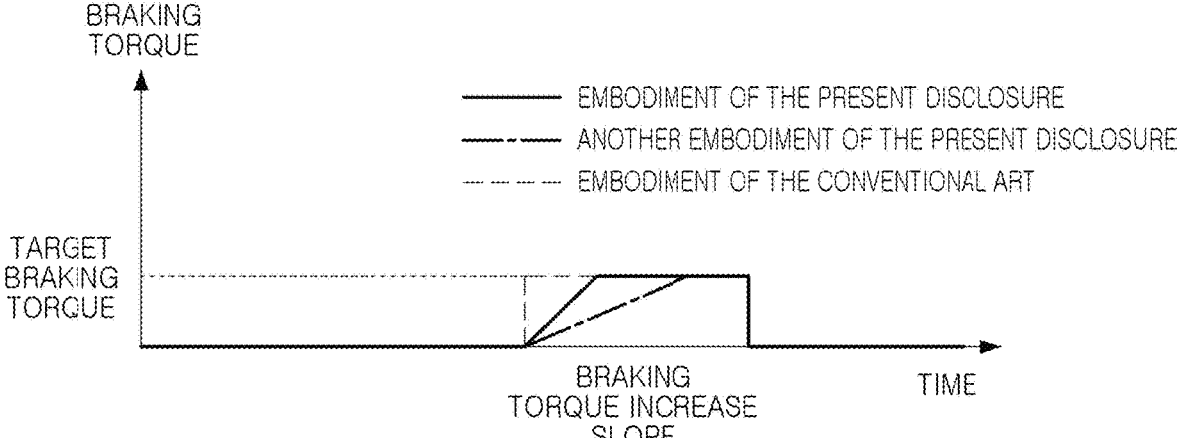
FIG. 4 is a graph illustrating a braking torque increase in slope according to an embodiment of the present disclosure.

FIG. 3 is a graph illustrating a driving torque increase slope according to an embodiment of the present disclosure. FIG. 4 is a graph illustrating a braking torque increase slope according to an embodiment of the present disclosure.

Referring to FIG. 3, in an embodiment of the conventional art, the driving torque was controlled so that the driving torque was immediately increased to the target driving torque.

In contrast, according to an embodiment of the present disclosure, the second controller 800 may increase the driving torque to form a predetermined slope up to the target driving torque.

Additionally, as in an embodiment of the present disclosure and other embodiments of the present disclosure, the second controller 800 may adjust the slope of the driving torque to increase the driving torque by the target driving torque.

The stuck state probability score according to an embodiment of the present disclosure may be smaller than the stuck state probability score according to another embodiment of the present disclosure.

In other words, the second controller 800 may increase the driving torque increase slope as the stuck state probability score decreases.

The off-road driving assistance device according to an embodiment of the present disclosure may lower the probability of a stuck state occurrence as compared to the conventional art. This is achieved by gently increasing the driving torque increase slope as the stuck state probability score increases.

Referring to FIG. 4, in an embodiment of the conventional art, the braking torque was controlled to immediately generate the target braking torque.

In contrast, according to an embodiment of the present disclosure, the second controller 800 may increase the braking torque to form a predetermined slope up to the target braking torque.

Additionally, as in an embodiment of the present disclosure and other embodiments of the present disclosure, the second controller 800 may adjust the slope of the braking torque to increase the braking torque by the target braking torque.

The stuck state probability score according to an embodiment of the present disclosure may be smaller than the stuck state probability score according to another embodiment of the present disclosure.

In other words, the second controller 800 may increase the braking torque increase slope as the stuck state probability score decreases.

The second controller 800 may directly control the driving torque or the braking torque, may perform control to achieve the same effect as indirectly controlling the driving torque and the braking torque by adjusting acceleration or deceleration, or may adjust the speed of the vehicle.

The off-road driving assistance device according to an embodiment of the present disclosure may lower the probability of a stuck state occurrence as compared to the conventional art, by gently increasing the braking torque increase slope as the stuck state probability score increases.

Referring to FIGS. 3 and 4, the off-road driving assistance device according to an embodiment of the present disclosure has the effect of lowering the probability of the stuck state occurrence by gradually changing the driving torque or the braking torque as the stuck state probability score increases.

FIG. 10 illustrates a table of an upward slope of a driving torque and an upward slope of a braking torque according to an embodiment of the present disclosure.

The off-road driving assistance device according to an embodiment of the present disclosure may set a table regarding the driving torque increase slope and braking torque increase slope according to the stuck state probability score illustrated in FIG. 10 and may store the table in the storage unit 400.

The second controller 800 may control the driving torque increase slope or the braking torque increase slope based on the table regarding the driving torque increase slope and the braking torque increase slope according to the stuck state probability score stored in the storage unit 400.

The second controller 800 may estimate a driving torque increase slope and a braking torque increase slope for a non-preset sticking probability score, using the driving torque increase slope or the braking torque increase slope for a preset sticking probability score and linear interpolation.

The off-road driving assistance device according to an embodiment of the present disclosure may further include a transmitter 900.

The transmitter 900 may transmit the driving torque or the braking torque according to the off-road driving control mode determined by the second controller 800 to a main controller through wired or wireless communication. Furthermore, the main controller may generate the driving torque or the braking torque by controlling a driving device or a braking device according to the received driving torque or the received braking torque.

Additionally, the transmitter 900 may directly transmit the driving torque or the braking torque according to an off-road driving control mode determined by the second controller 800 to a controller of the driving device or the braking device through wired or wireless communication and may generate driving torque or the braking torque.

The transmitter 900 may transmit the driving torque or the braking torque according to the off-road driving control mode determined by the second controller 800 through Ethernet, media-oriented systems transport (MOST), flexray, a controller area network (CAN), a local interconnect network (LIN), and the like.

The driving device may be a device capable of generating driving torque for enabling the vehicle to drive.

There may be at least two driving devices and driving torque of front wheels and driving torque of rear wheels may be generated differently.

Additionally, the driving device may include a first driving device generating the driving torque to the front wheels and a second driving device generating the driving torque to the rear wheels.

However, the present disclosure is not limited thereto, and the first driving device may generate the driving torque to the rear wheels, and the second driving device may generate the driving torque to the front wheels.

Additionally, the first driving device and the second driving device may include at least one electric motor or engine to separately generate driving torque to the front and rear wheels.

Additionally, the first driving device and the second driving device may be combined in various manners to generate the driving torque to the vehicle.

For example, the first driving device and the second driving device may both be electric motors or may both be engines. Alternatively, one of the first driving device and the second driving device may be an electric motor, and the other driving device may be an engine.

Furthermore, the first driving device and the second driving device may be in-wheel motors that are mounted on individual wheels generating driving torque, but the present disclosure is not limited thereto. Various means capable of generating driving torque of the vehicle may be applied by the driving device.

The braking device may be a device that generates braking torque to slow down or stop the vehicle.

Additionally, the braking device may generate braking torque to each wheel.

The braking device may be a hydraulic wheel brake that operates using hydraulic pressure or may be an electro-electronic wheel brake (e.g., an electro-mechanical brake (EMB)) that operates using electrical energy.

Figure 5:
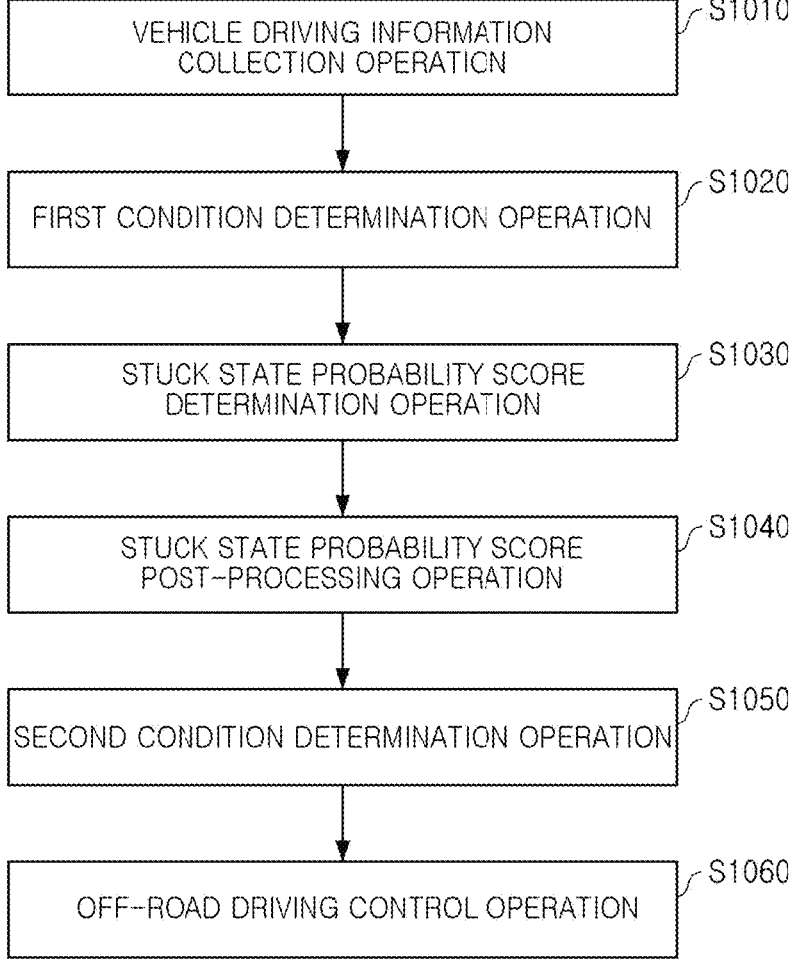
FIG. 5 is a flowchart of an off-road driving assistance method according to an embodiment of the present disclosure.
Figure 6:
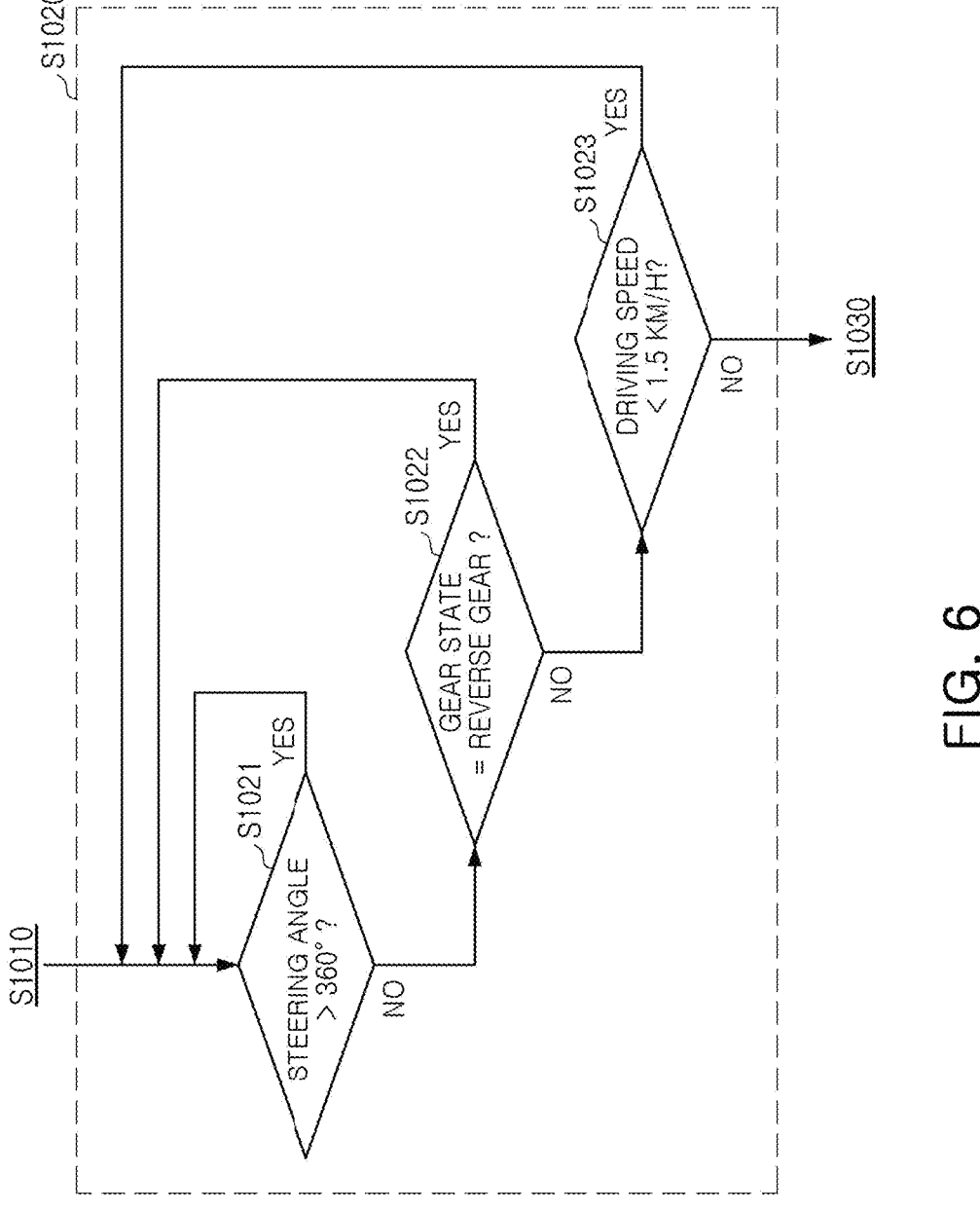
FIG. 6 is a flowchart illustrating step S1020 of FIG. 5 in more detail according to an embodiment of the present disclosure.
Figure 7:
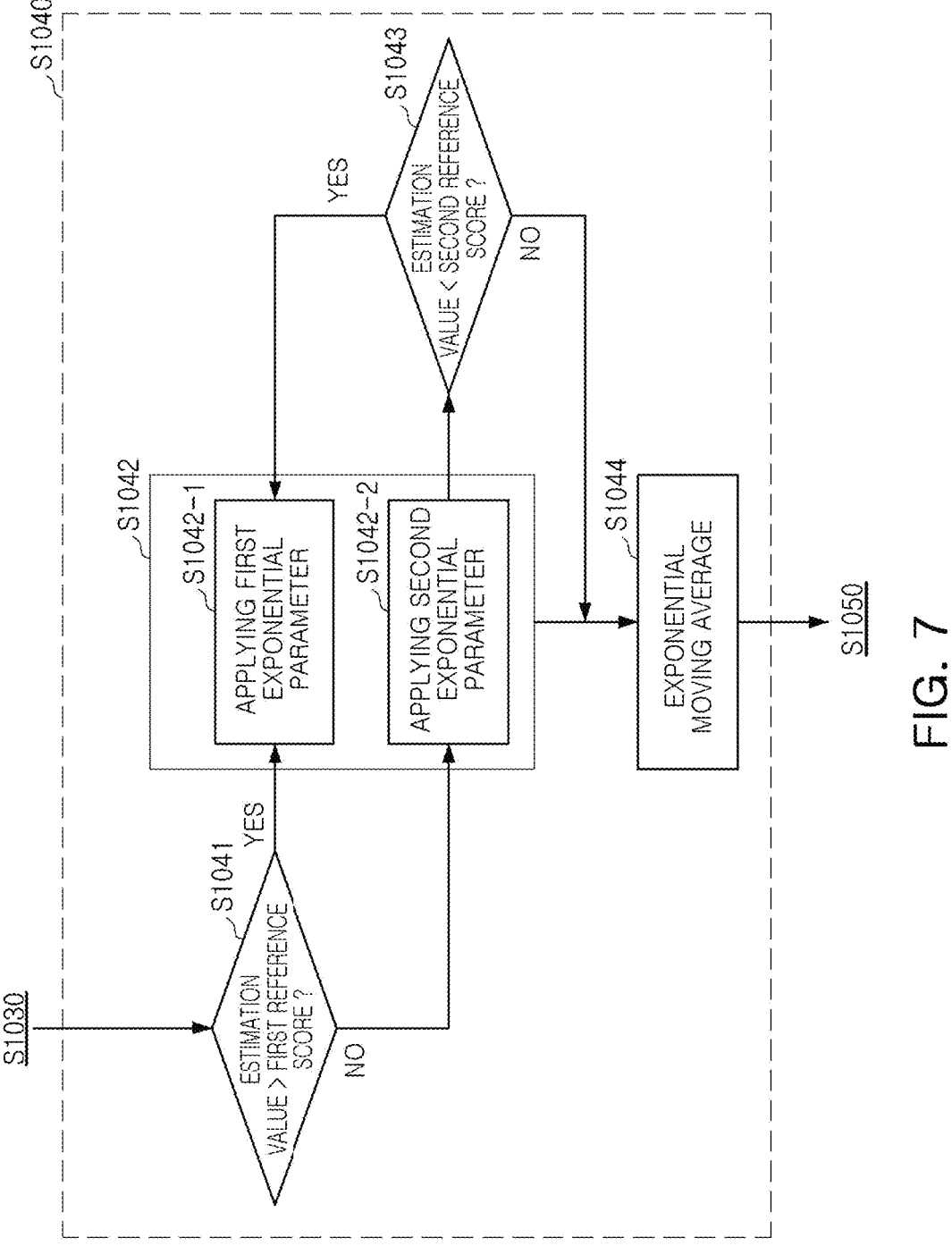
FIG. 7 is a flowchart illustrating step S1040 of FIG. 5 in more detail according to an embodiment of the present disclosure.
Figure 8:
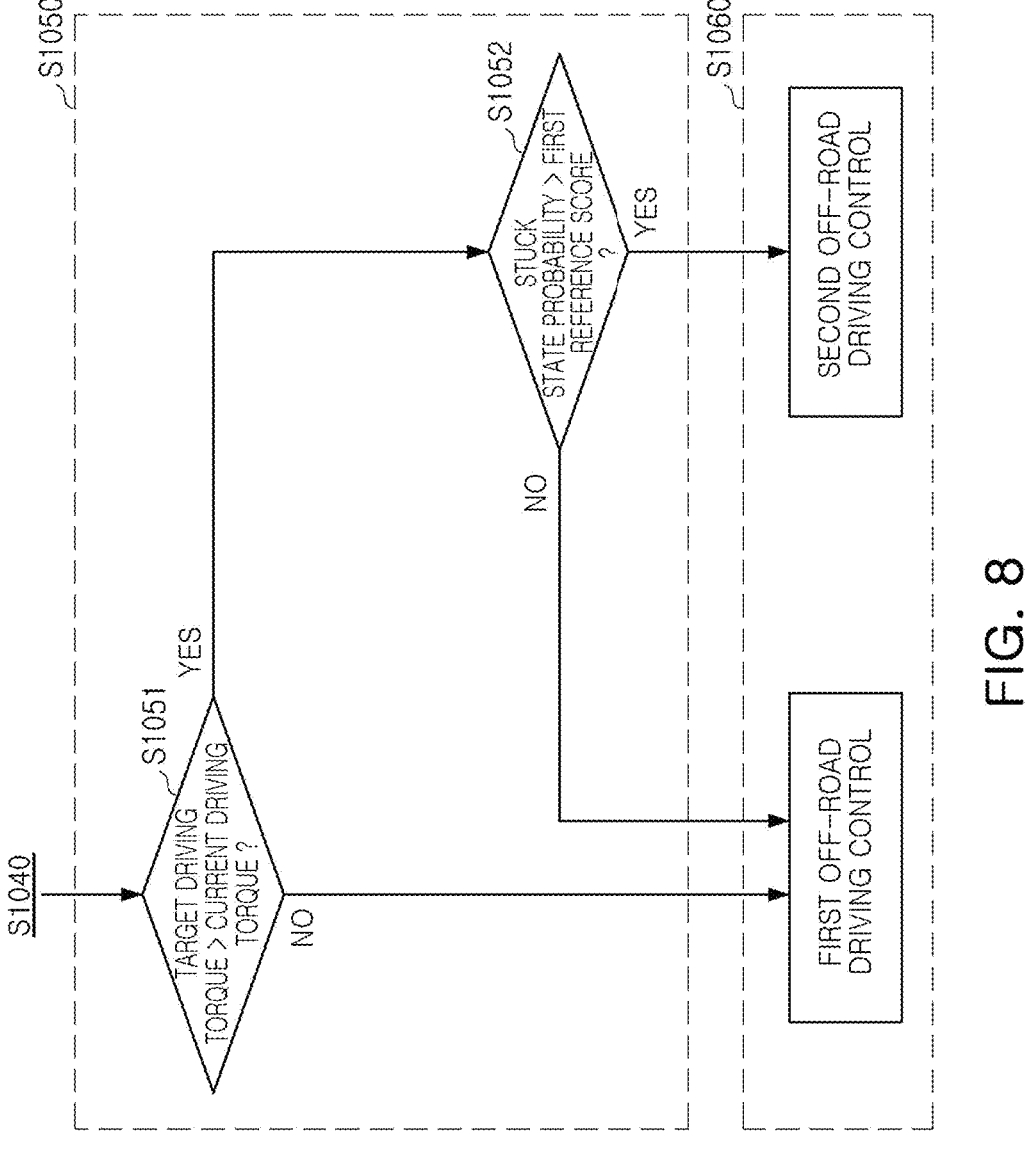
FIG. 8 is a flowchart illustrating step S1050 of FIG. 5 in more detail according to an embodiment of the present disclosure.
Figure 9:
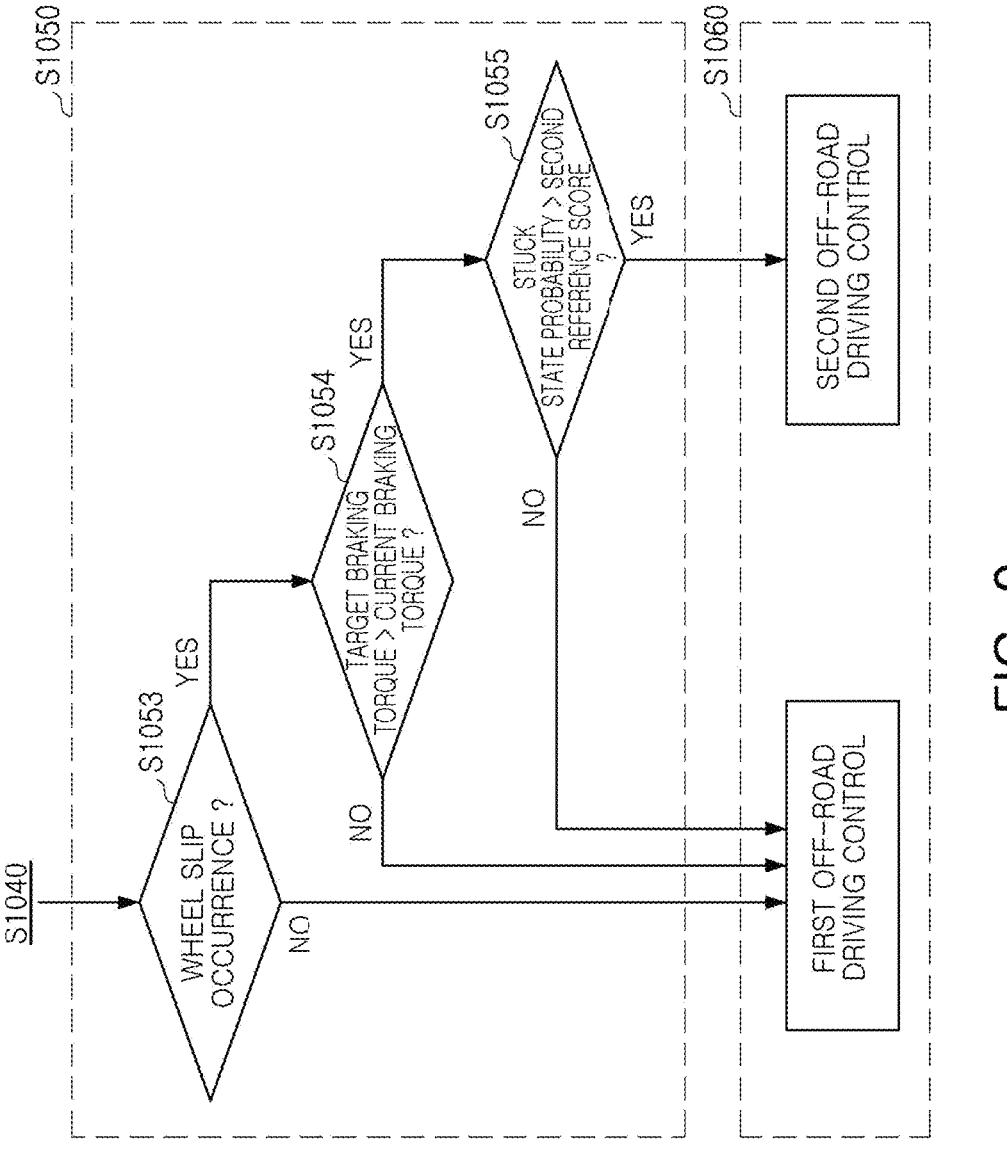
FIG. 9 is a flowchart illustrating step S1050 of FIG. 5 in more detail according to another embodiment of the present disclosure.

FIG. 5 is a flowchart illustrating an off-road driving assistance method according to an embodiment of the present disclosure. FIG. 6 is a detailed flowchart illustrating operation S1020 of FIG. 5 according to an embodiment of the present disclosure. FIG. 7 is a detailed flowchart illustrating operation S1040 of FIG. 5 according to an embodiment of the present disclosure. FIG. 8 is a detailed flowchart illustrating operation S1050 of FIG. 5 according to an embodiment of the present disclosure. FIG. 9 is a detailed flowchart illustrating operation S1050 of FIG. 5 according to another embodiment of the present disclosure.

Referring to FIG. 5, an off-road driving assistance method according to an embodiment of the present disclosure includes a vehicle driving information collection operation (S1010), a first condition determination operation (S1020), a stuck state probability score determination operation (S1030), a stuck state probability score post-processing operation (S1040), a second condition determination operation (S1050), and an off-road driving control operation (S1060).

In the off-road driving assistance method according to an embodiment of the present disclosure, the driving information collection operation (S1010) may receive driving information of a vehicle through the receiver 100.

Additionally, the driving information collection operation may receive estimated information through the estimation unit 200.

The driving information may include information such as a wheel slip rate, an accelerator pedal opening amount, a vehicle speed, a road surface severity, a steering angle, and a gear level of a current driving vehicle.

The vehicle speed may be the vehicle speed measured through the receiver 100 or the off-road driving speed estimated by the second estimation unit 220.

The estimation unit 200 may include a first estimation unit 210 configured to estimate road surface severity and a second estimation unit 220 configured to estimate the off-road driving speed of the vehicle.

The second estimation unit 220 may estimate the wheel slip rate using a deeply learned wheel slip estimation model and may estimate the off-road driving speed using the estimated wheel slip rate.

The first estimation unit 210 may estimate the road surface severity using a deeply learned road surface severity estimation model.

The off-road driving assistance method according to an embodiment of the present disclosure may determine a first condition using the collected driving information (S1020).

The off-road driving assistance method according to an embodiment of the present disclosure may determine whether to determine a stuck state probability score by determining the first condition.

In certain situations, it may be very difficult to determine the stuck state probability. Furthermore, even if the stuck state probability is determined, the accuracy thereof may be very low. Additionally, in some cases, the stuck state probability may be so low that determining the stuck state probability may be meaningless.

In other words, in the operation of determining the first condition, the first controller 500 may determine whether to start determining the stuck state probability score based on a driving state of the vehicle.

Accordingly, it may be possible to avoid determining the stuck state probability when the probability of the vehicle being stuck is very low, or the vehicle is in a driving state in which the stuck state probability is difficult to accurately determine.

Examples of a driving state in which the stuck state probability is difficult to accurately determine may include cases in which the vehicle is making a sharp turn, is reversing, or is close to a stop state.

Referring to FIG. 6, the off-road driving assistance method according to an embodiment of the present disclosure may not determine the stuck state probability when a steering angle exceeds an angle setting value (e.g., 360 degrees) (S1021).

The off-road driving assistance method according to an embodiment of the present disclosure may confirm a gear state when the steering angle does not exceed the angle setting value (e.g., 360 degrees), and may not determine the stuck state probability when a gear state is in a reverse gear (S1022).

The off-road driving assistance method according to an embodiment of the present disclosure may confirm whether the vehicle speed is less than a speed set value (e.g., 1.5 km/h) when the gear state is not in a reverse gear. Additionally, the off-road driving assistance method may not determine the stuck state probability when the vehicle speed is less than the speed set value (e.g., 1.5 km/h) (S1023).

The off-road driving assistance method according to an embodiment of the present disclosure may determine the stuck state probability when the vehicle speed is greater than or equal to a speed set value (e.g., 1.5 km/h).

In other words, the off-road driving assistance method according to an embodiment of the present disclosure may determine the stuck state probability when the steering angle does not exceed an angle setting value (e.g., 360 degrees), the gear is not a reverse gear, and the vehicle speed is greater than the speed set value (e.g., 1.5 km/h). Additionally, the off-road driving assistance method may not determine the stuck state probability if at least one condition is not satisfied.

The order of operations S1021, S1022, and S1023 may be changed, may be connected in parallel rather than sequentially, and may be determined simultaneously.

When it is determined to determine the stuck state probability, an operation of determining the stuck state probability of the vehicle may be performed based on the driving information (S1030).

The stuck state probability may be determined as a probability score using a meta model formed of a plurality of parameters.

The meta model may be defined as a function including the plurality of parameters. Each of the plurality of parameters constituting the meta model may be formed of individual functions.

The meta model may be formed of the plurality of parameters in a multiplication form or an addition form. A meta model formed in the multiplication form may be referred to as a first meta model, and the meta model formed in the addition form may be referred to as a second meta model.

The meta model may be preset and stored and may be updated periodically or continuously based on real-time driving data.

In the operation of determining the stuck state probability, the stuck state probability score may be determined using the meta model based on the driving information collected in operation S1010. The meta model according to an embodiment of the present disclosure may be comprised of parameters including one or more values of a wheel slip rate, an accelerator pedal opening amount, a vehicle speed, and a road surface severity.

The off-road driving assistance method according to an embodiment of the present disclosure may determine the stuck state probability using the meta model and may thus determine the stuck state probability more accurately by simultaneously applying values determined by a plurality of parameters, rather than applying the plurality of parameters sequentially according to importance.

Specifically, the off-road driving assistance method according to an embodiment of the present disclosure may apply the meta model rather than a rule-based model. As a result, the off-road driving assistance method may determine the stuck state probability more accurately by comprehensively considering changes in a plurality of parameters regardless of an application order or a priority of the plurality of parameters that determine the stuck state probability.

After the stuck state probability score is determined, the off-road driving assistance method according to an embodiment of the present disclosure may perform an operation of post-processing the determined stuck state probability (S1040).

In the operation of post-processing the stuck state probability, various post-processing methods may be applied depending on the meta model.

In the operation of post-processing the stuck state probability, the stuck state probability may be post-processed using the number of windows. The post-processing method of determining the stuck state probability using the number of windows may be referred to as the first post-processing method.

More specifically, the first post-processing method may determine the stuck state probability using the number of windows in which a stuck state probability score exceeding a preset score is calculated during a preset time.

For example, the first post-processing method may store a score calculated by the first controller 500 and may generate a window having a predetermined length. For example, the post-processing unit 600 may generate 20 windows at 50 ms (milli-second) intervals. Scores may be stored in the generated window.

1 or 0 may be stored in the generated window. When a score (e.g., 0.3) calculated by the first controller 500 is greater than a preset score (e.g., 0.15), 1 may be stored in a corresponding window. Additionally, when the score (e.g., 0.1) calculated by the first controller 500 is less than a preset score (e.g., 0.15), 0 may be stored.

The stuck state probability can be expressed in numbers as a ratio of the number of windows exceeding a preset score to a preset window size. For example, when there are 15 windows in which 1 is stored, among 20 windows, the stuck state probability may be displayed as 75 percent.

Data input to the window may have a first in first out (FIFO) structure. The FIFO may be a structure in which data is sequentially output in the order in which data is input, i.e., a value input first is output first.

The first post-processing method may be applied when determining the stuck state probability using the first meta model, but the present disclosure is not limited thereto.

In the operation of post-processing the stuck state probability, post-processing may be performed using an exponential moving average (EMA). The post-processing using the exponential moving average may be referred to as a second post-processing method.

The exponential moving average (EMA) may be a moving average that gives greater weight and significance to the most recent data point.

By utilizing the exponential moving average, the post-processing unit 600 may prevent noise in the stuck state probability score calculated by a stuck state probability calculation unit and may derive a more accurate stuck state probability by reflecting past values.

Additionally, the second post-processing method may perform the post-processing by applying the exponential parameter applied to the exponential moving average differently depending on a size of the stuck state probability.

The exponential moving average may increase a proportion of past data as a size of the exponential parameter increases, thereby allowing for more stable and accurate estimation. However, with an increase in the proportion of past data, immediate response to current data may not be possible and delay times may occur.

Accordingly, it may be possible to estimate more accurately by adjusting the size of the exponential parameter depending on the situation.

Referencing FIG. 7, a stuck state probability score value received from the first controller 500 may be compared with a preset first reference score (e.g., 0.5) (S1041). Additionally, exponential parameters having different sizes may be applied depending on the comparison results (S1042).

More specifically, when the stuck state probability score value is greater than the first reference score, a second exponential parameter (e.g., 0.001) may be applied (S1042-1). Additionally, when the stuck state probability score value is smaller than the first reference score, a first exponential parameter (e.g., 0.01) may be applied (S1042-2).

The first exponential parameter (e.g., 0.01) may be greater than the second exponential parameter (e.g., 0.001).

In other words, when the stuck state probability is determined to be high through the second post-processing, the second exponential parameter may be applied, so that the first controller 500 may be configured to more accurately determine the stuck state probability by reflecting more past data.

Additionally, even when the second exponential parameter is applied, a stuck state probability score value received from the first controller 500 may be compared with the second reference score (e.g., 0.1) (S1043).

When the stuck state probability score value is greater than the second reference score, the second exponential parameter may be maintained. When the stuck state probability score value is lower than the second reference score, the first exponential parameter may be applied (S1042).

Accordingly, when the stuck state probability score value is lower than the second reference score, a current driving state may have a low stuck state probability occurrence. As a result, a load on a system may be reduced by applying a relatively large exponential parameter value.

In the operation of post-processing the stuck state probability, after the first exponential parameter or the second exponential parameter is determined, the stuck state probability score value determined in the stuck state probability determination operation may be subject to the post-processing of the exponential moving average using the determined exponential parameter (S1044).

After post-processing the stuck state probability score, the off-road driving assistance method according to an embodiment of the present disclosure may perform a second condition determination operation based on the post-processed stuck state probability score (S1050).

Additionally, the off-road driving assistance method according to an embodiment of the present disclosure may perform first off-road driving control or second off-road driving control depending on second condition determination results (S1060).

In the off-road driving control operation, driving torque or braking torque determined by the second controller 800 according to the first off-road driving control or the second off-road driving control may be transmitted to a driving device or a braking device through the transmitter 900. As a result, the driving device or braking device may generate the driving torque or braking torque determined by the second controller 800.

The first off-road driving control may generate driving torque and braking torque according to driving information received from the receiver 100.

For example, the first off-road driving control may immediately generate driving torque and braking torque from the receiver 100. Additionally, the first off-road driving control may instantly generate driving torque and braking torque like a STEP.

Additionally, the second off-road driving control may be a device configured to gradually generate driving torque and braking torque according to driving information received from the receiver 100.

For example, the second off-road driving control may gradually increase the driving torque and the braking torque and may instantaneously generate the driving torque and braking torque received from the receiver 100.

Specifically, the second off-road driving control may adjust a change rate of driving torque and the braking torque based on the stuck state probability score.

When the stuck state probability is high, the second off-road driving control may make a smaller change in the driving torque and the braking torque than a case in which the stuck state probability is low.

For example, when the stuck state probability is high, the second off-road driving control may form a lower increase slope of the driving torque and the braking torque than a case in which the stuck state probability is low.

In the second off-road driving control, as the stuck state probability increases, a change in the driving torque and the braking torque may be reduced, thereby reducing the probability of a stuck state occurrence in the vehicle due to a change in the driving torque and the braking torque.

In the second condition determination operation, the second controller may determine an off-road driving control method based on the driving information and the stuck state probability score received from the receiver 100.

Referring to FIG. 8, the second condition determination operation may determine whether to control an increase slope of the driving torque based on the driving torque information received from the receiver 100.

The second condition determination operation may compare a magnitude of a target driving torque with a magnitude of a current driving torque (S1051).

When the magnitude of the target driving torque is lower than the magnitude of the current driving torque, the off-road driving control operation may perform the first off-road driving control.

When the magnitude of the target driving torque is higher than the magnitude of the current driving torque, the size of the stuck state probability may be compared with a preset first reference score (e.g., a stuck state probability score of 50 points) (S1052).

When the stuck state probability is lower than the preset first reference score (e.g., a stuck state probability score of 50 points), the off-road driving control operation may perform the first off-road driving control.

When the stuck state probability is higher than the preset first reference score (e.g., a stuck state probability score of 50 points), the off-road driving control operation may perform the second off-road driving control.

Referring to FIG. 9, the second condition determination operation may determine whether to control the increase slope of the braking torque based on braking torque information received from the receiver 100.

The second condition determination operation may confirm whether wheel slip has occurred (S1053). In a vehicle driving on an off-road surface, when wheel slip occurs, braking torque may be generated on the wheel in which the slip occurred in order to control an attitude of the vehicle.

When the wheel slip does not occur, the off-road driving control operation may perform the first off-road driving control.

When it is confirmed that wheel slip has occurred, the second condition determination operation may compare a magnitude of a target braking torque with a magnitude of a current braking torque (S1054).

When the magnitude of the target braking torque is lower than the magnitude of the current braking torque, the off-road driving control operation may perform the first off-road driving control.

When the magnitude of the target braking torque is higher than the magnitude of the current braking torque, the size of the stuck state probability may be compared with a preset second reference score (e.g., a stuck state probability score of 50 points) (S1055).

The first reference score and the second reference score may be the same, but the present disclosure is not limited thereto. The first reference score and the second reference score may be applied in different sizes.

When the stuck state probability is lower than the preset second reference score (e.g., a stuck state probability score of 50 points), the off-road driving control operation may perform the first off-road driving control.

When the stuck state probability is higher than the preset second reference score (e.g., a stuck state probability score of 50 points), the off-road driving control operation may perform the second off-road driving control.

The off-road driving assistance method according to an embodiment of the present disclosure limits an increase slope of the driving torque or the braking torque based on the driving information and the stuck state probability score. As a result, the off-road driving assistance method gradually generates the driving torque or the braking torque on a road having a high stuck state probability and reduces the stuck state probability of the vehicle.

Off-road driving assistance methods according to the present disclosure may be implemented in the form of program instructions that can be executed through various computer means and may be recorded on a computer-readable medium. The computer-readable medium may include program instructions, data files, and data structures alone or in combination. Program instructions recorded on the computer-readable medium may be specially designed and constructed for the present disclosure or may be known and usable by those having ordinary skill in the art.

Examples of the computer-readable medium include a hardware device specially configured to store and execute program instructions, such as ROM, RAM, a flash memory, and the like. Examples of program instructions include a machine language code, such as that produced by a compiler, as well as a high-level language code that can be executed by a computer using an interpreter, and the like. The above-described hardware device may be configured to operate with at least one software module so as to perform the operations of the present disclosure, and vice versa.

While embodiments have been illustrated and described above, it should be apparent to those skilled in the art that modifications and variations could be made without departing from the scope of the present disclosure as defined by the appended claims.

What is claimed is:

1. An off-road driving assistance device, comprising:
    a receiver configured to receive driving information of a vehicle;
    a first controller configured to determine a stuck state probability score based on the driving information; and
    a second controller configured to control a magnitude of a driving torque or a braking torque based on the driving information and the stuck state probability score,
    wherein the second controller is configured to adjust a change in slope of the driving torque or the braking torque according to the stuck state probability score and control the magnitude of the driving torque or the braking torque.

2. The off-road driving assistance device according to claim 1, wherein the second controller is configured to decrease or increase the change in the slope of the driving torque or the braking torque as the stuck state probability score increases or decreases.

3. The off-road driving assistance device according to claim 1, wherein the second controller is configured to control the driving torque or the braking torque by one of a first off-road driving control and a second off-road driving control.

4. The off-road driving assistance device according to claim 3, wherein in the first off-road driving control, the second controller is configured to control the driving torque or the braking torque to occur immediately.

5. The off-road driving assistance device according to claim 3, wherein in the second off-road driving control, the second controller is configured to adjust the change in the slope of the driving torque or the braking torque based on the stuck state probability score and control the magnitude of the driving torque or the braking torque.

6. The off-road driving assistance device according to claim 3, further comprising:

a determination unit configured to determine performance of control by one of the first off-road driving control and the second off-road driving control.

7. The off-road driving assistance device according to claim 6, wherein the determination unit is configured to determine the second controller to perform control by one of the first off-road driving control and the second off-road driving control, based on the magnitude of the driving torque or the braking torque and the stuck state probability score.

8. The off-road driving assistance device according to claim 1, further comprising:

a storage unit configured to store a table in which the change in the slope of the driving torque and the braking torque based on the stuck state probability score is previously set.

9. The off-road driving assistance device according to claim 8, wherein the second controller is configured to adjust the change in the slope of the driving torque or the braking torque based on the table and control the magnitude of the driving torque or the braking torque.

10. The off-road driving assistance device according to claim 1, further comprising:

a transmitter configured to transmit the magnitude of the driving torque or the braking torque to a driving device or a braking device.

11. An off-road driving assistance method, comprising:

receiving driving information of a vehicle;

determining, by a first controller, a stuck state probability score; and controlling off-road driving based on the driving information and the stuck state probability score, wherein, in controlling off-road driving, a change in slope of a driving torque or a braking torque is adjusted based on the stuck state probability score and wherein a magnitude of the driving torque or the braking torque is controlled.

12. The off-road driving assistance method according to claim 11, wherein, in controlling off-road driving, as the stuck state probability score increases or decreases, the change in the slope of the driving torque or the braking torque decreases or increases.

13. The off-road driving assistance method according to claim 11, wherein, in controlling off-road driving, the driving torque or the braking torque is controlled by one of a first off-road driving control and a second off-road driving control.

14. The off-road driving assistance method according to claim 13, wherein, in the first off-road driving control, in controlling off-road driving, the driving torque or the braking torque is controlled to occur immediately.

15. The off-road driving assistance method according to claim 13, wherein, in the second off-road driving control, in controlling off-road driving, the change in the slope of the driving torque or the braking torque is adjusted based on the stuck state probability score and wherein the magnitude of the driving torque or the braking torque is controlled.

16. The off-road driving assistance method according to claim 13, wherein controlling off-road driving further comprises:

a second condition determination operation for determining performance of control by one of the first off-road driving control or the second off-road driving control.

17. The off-road driving assistance method according to claim 16, wherein, in controlling off-road driving, a second controller is configured to perform control by one of the first off-road driving control or the second off-road driving control based on the magnitude of the driving torque or the braking torque and the stuck state probability score.

18. The off-road driving assistance method according to claim 11, wherein, in the controlling off-road driving, the change in the slope of the driving torque or the braking torque is adjusted and the magnitude of the driving torque or the braking torque is controlled based on a table regarding a change in slope of the driving torque and the braking torque depending on the stuck state probability score, which is preset and stored in a storage unit.

19. The off-road driving assistance method according to claim 11, wherein controlling off-road driving further comprises:

transmitting the magnitude of the driving torque or the braking torque to a driving device or a braking device.

\* \* \* \* \*